(12) United States Patent
Pettey

(10) Patent No.: US 10,099,071 B2
(45) Date of Patent: Oct. 16, 2018

(54) MULTIPURPOSE DEVICE FOR USE WITH A ROPE

(71) Applicant: Billy D. Pettey, Trinity, AL (US)

(72) Inventor: Billy D. Pettey, Trinity, AL (US)

( * ) Notice: Subject to any disclaimer, the term of this patent is extended or adjusted under 35 U.S.C. 154(b) by 0 days.

(21) Appl. No.: 15/269,595

(22) Filed: Sep. 19, 2016

(65) Prior Publication Data

US 2017/0080260 A1 Mar. 23, 2017

Related U.S. Application Data

(60) Provisional application No. 62/219,972, filed on Sep. 17, 2015.

(51) Int. Cl.
| | | |
|---|---|---|
| *A62B 1/14* | (2006.01) | |
| *A62B 1/20* | (2006.01) | |
| *A63B 29/08* | (2006.01) | |
| *F16B 45/00* | (2006.01) | |

(52) U.S. Cl.
CPC ............... *A62B 1/14* (2013.01); *A63B 29/08* (2013.01); *F16B 45/00* (2013.01)

(58) Field of Classification Search
CPC .. A62B 1/14; A62B 1/20; A63B 29/08; F16B 45/00
See application file for complete search history.

(56) References Cited

U.S. PATENT DOCUMENTS

| | | | | | |
|---|---|---|---|---|---|
| 356,116 | A | * | 1/1887 | Garfield | F16G 11/14 16/202 |
| 386,237 | A | * | 7/1888 | Budd | A62B 1/06 188/65.4 |
| 518,880 | A | * | 4/1894 | Evans | G03G 15/10 114/223 |
| D26,071 | S | * | 9/1896 | Howland et al. | 188/65.4 |
| D32,172 | S | * | 1/1900 | Armbruster | 188/65.4 |
| 649,458 | A | * | 5/1900 | Ives | A62B 1/06 188/65.4 |
| 2,151,664 | A | * | 3/1939 | Redfield | D06F 53/00 24/129 R |
| 2,193,236 | A | * | 3/1940 | Meighan | F16G 11/14 24/129 R |
| 2,538,021 | A | * | 1/1951 | Lushbaugh | E04H 15/322 135/120.2 |
| 3,197,204 | A | * | 7/1965 | Holkesvick | A63B 21/018 188/65.4 |

(Continued)

*Primary Examiner* — Bradley T King
*Assistant Examiner* — James K Hsiao
(74) *Attorney, Agent, or Firm* — Mark Clodfelter

(57) ABSTRACT

A multifunction device for use generally with ropes and cords is disclosed. A rope portion of the device is about three times longer as it is wide. A brake bar extends perpendicularly from one end of the rope portion, and a brake retainer extends upward and perpendicular from the brake bar, forming a slot between the rope portion and brake retainer. There are three openings in the rope portion, one at each end, with the middle opening offset toward the upper opening for accommodating a narrowed region in said rope portion below the middle opening. The rope portion is about 3 times longer than its width, the brake bar is about half as wide as the rope portion and the brake retainer is about half as wide as the brake bar. The device has use as a belay, a rappel, an anchor, an auger, a toggle and other uses.

8 Claims, 10 Drawing Sheets

(56) References Cited

U.S. PATENT DOCUMENTS

| | | | |
|---|---|---|---|
| 3,309,745 A * | 3/1967 | Gintz | H02G 7/056 174/79 |
| 3,678,543 A * | 7/1972 | Hobbs | A62B 1/04 182/191 |
| 3,695,397 A * | 10/1972 | Hobbs | A62B 1/06 182/5 |
| 3,757,901 A * | 9/1973 | Hobbs | A62B 1/14 182/5 |
| 3,869,021 A * | 3/1975 | Sutherland | A62B 35/0018 182/135 |
| 3,911,610 A * | 10/1975 | Goodman | A01K 91/06 43/43.1 |
| 4,678,059 A * | 7/1987 | Bowker | A62B 1/04 182/5 |
| 4,723,634 A * | 2/1988 | Fisk | A62B 1/04 182/5 |
| 4,733,862 A * | 3/1988 | Miller | A63B 21/0552 24/129 R |
| 5,217,092 A * | 6/1993 | Potter | A62B 1/04 188/65.1 |
| 5,352,172 A * | 10/1994 | Suzaki | A63B 21/018 182/191 |
| 6,095,282 A * | 8/2000 | Sadeck | A62B 1/04 182/191 |
| 6,317,935 B1* | 11/2001 | O'Rouke | A62B 1/04 24/115 K |
| 7,143,708 B1* | 12/2006 | Cimino | B63B 59/02 114/218 |
| 7,353,766 B1* | 4/2008 | Wiese | B63B 21/045 114/218 |
| 7,636,986 B2* | 12/2009 | Sorensen | B60P 7/0823 24/129 A |
| 7,722,644 B2* | 5/2010 | Fallin | A61B 17/0401 24/129 R |
| D684,845 S * | 6/2013 | Wood | A62B 1/14 D8/356 |
| 8,495,800 B2* | 7/2013 | Lipke | A62B 1/06 182/191 |
| 8,864,797 B2* | 10/2014 | Justin | A61B 17/0487 606/232 |
| 8,925,680 B2* | 1/2015 | Herrli | A62B 1/14 182/192 |
| 9,662,102 B2* | 5/2017 | Hart | A61B 17/0401 |
| 2013/0145582 A1* | 6/2013 | Chupp | F16G 11/12 24/129 R |
| 2016/0213953 A1* | 7/2016 | Galyan | A62B 1/14 |

* cited by examiner

MULTIPURPOSE DEVICE FOR USE WITH A ROPE

CROSS REFERENCE TO RELATED APPLICATIONS

This application claims the benefit of Applicant's U.S. provisional application No. 62/219,972, filed Sep. 17, 2015, and which is incorporated herein in its entirety by reference.

FIELD OF THE INVENTION

This invention relates to implements used with a rope, and particularly to a multifunction device that can be used for anchoring, rappelling, belaying, generally locking something to a rope and the like without having to thread an end of a rope into the device.

BACKGROUND OF THE INVENTION

In various activities involving the use of ropes, various devices are used for specific functions. For instance, carabiners are used to connect loosely to a rope. A belay device is used in conjunction with a safety anchor near a climber that a rope attached to the climber passes through, the belay device used by another climber or person below to lock off the rope in case the climber falls so that the climber doesn't fall further than the distance between the safety anchor and a small amount of slack in the rope. Rock anchors that are typically cam devices, rock screws and the like that are used to provide anchoring points in rock and even ice.

Rigging plates and rigging anchors exist that provide points from which a single plate is secured to an anchor point and to which multiple carabiners or ropes may be anchored. A figure 8 descender may be used for emergency rappelling, but friction of the device on the rope may not be sufficient to easily control a heavy load, such as a person. However, these are all separate devices that must be carried separately or independently, and which must be rigged independently. In some of these devices, such as most belay devices, the rope must be threaded through the device in order to use it. In virtually every instance, a harness is worn by the user, the harness secured to a device that attaches to a rope.

Emergency rescues, including rescuing oneself from an immediately dangerous situation, often involve lowering oneself or others to safety using a rope. In the instance of a burning multi-story building, desperate situations arise where the only possible egress from the building is through a window, balcony or the like. In this case, and where a rope is used, the rope must be secured to an anchor of sufficient strength to support at least the weight of a person, or in some instances, two people. The rope must then be threaded through a belay device or descender, and gradually released through the belay device or figure 8 while relying on friction created by the device to serve as a brake. Problems with these devices are the time it takes to rig them, which as noted may involve threading a rope through a belay device, and in some instances, a relatively complex rigging scheme. In a burning building that is rapidly filling with smoke or in imminent danger of collapse, any time spent looking for the right device and/or attempting to thread rope through a device may prove disastrous, particularly considering the mental state of those in danger who are not going to be the coolest of thinkers at that point in time.

Accordingly, there is a need for a single device to perform numerous operations in conjunction with use of a rope and which is simple to use as a belay device, a rappelling device, an anchor, a gouge for digging out soft materials, a glass breaker, and so forth.

DETAILED DESCRIPTION OF THE DRAWINGS

Referring to FIGS. 1-6, a device 10 for use with a rope is shown. In general, device 10 may be constructed in a generally square or rectangular configuration of from around 1.5 inches of generally square or rectangular configuration, to embodiments of up to about 5 to 6 inches of generally square or rectangular configuration. Smaller devices of 1-2 inches or so may be used in conjunction with light cord, such as toggles for tying off tents, camping awnings, bear bags, securing gear and the like.

Device 10 may be constructed of a light, strong material, such as aluminum or aluminum alloys, but could also be of titanium or titanium alloys or other strong, durable metal. Steel and stainless steel alloys are also possible, although heavier. In other embodiments, device 10 may be non-metallic, as by being constructed of a strong, durable plastic, such as high density polyurethane, or a composite material such as carbon fiber/epoxy or similar materials. Where device 10 is constructed of a non-metallic material, its dimensions may be made thicker or thinner in order to support loads in accordance with its anticipated use.

Figure 1:
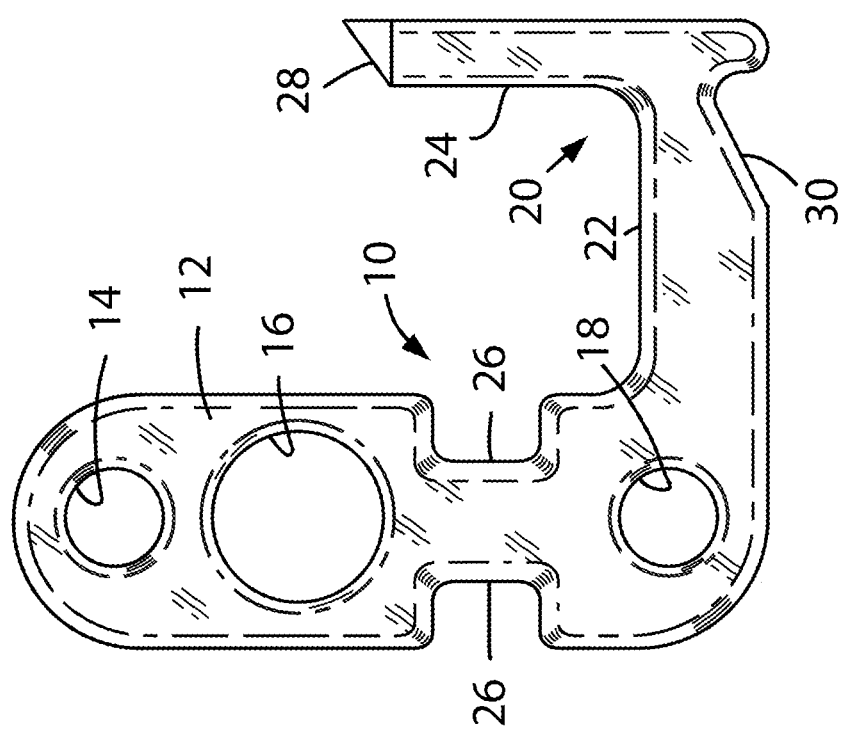
FIG. 1 is a front or rear planar view of a device of the invention.
Figure 3:
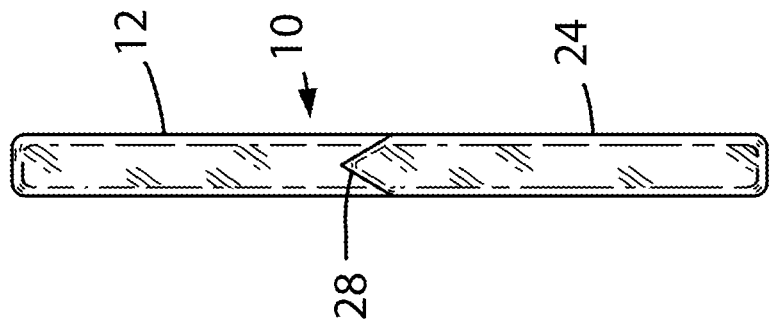
FIG. 3 is a side edge view from a right side with respect to FIG. 1.
Figure 4:
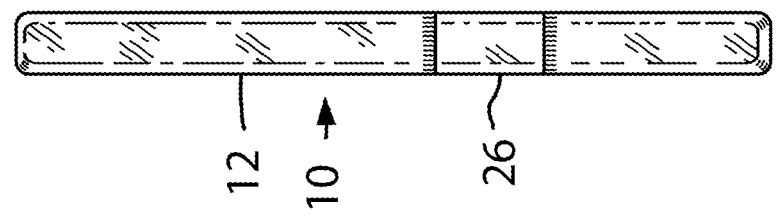
FIG. 4 is a side edge view from a left side with respct to FIG. 1.
Figure 5:
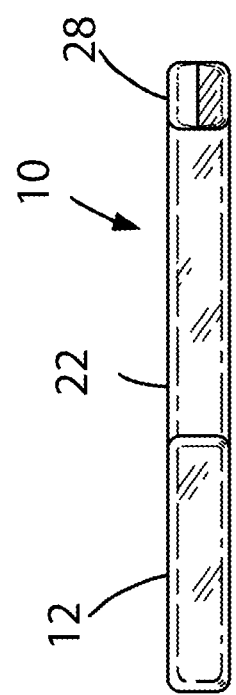
FIG. 5 is a top edge view from a top with respect to FIG. 1.
Figure 2:
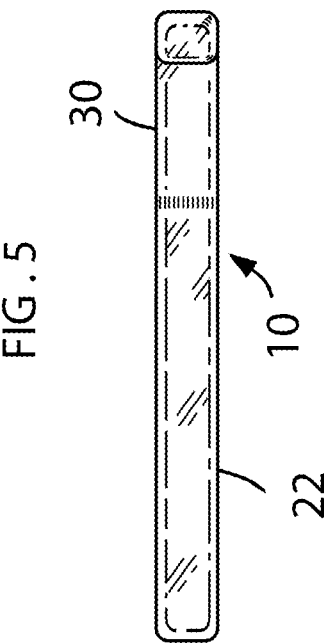
FIG. 2 is a bottom edge view from a bottom with respect to FIG. 1.
Figure 6:
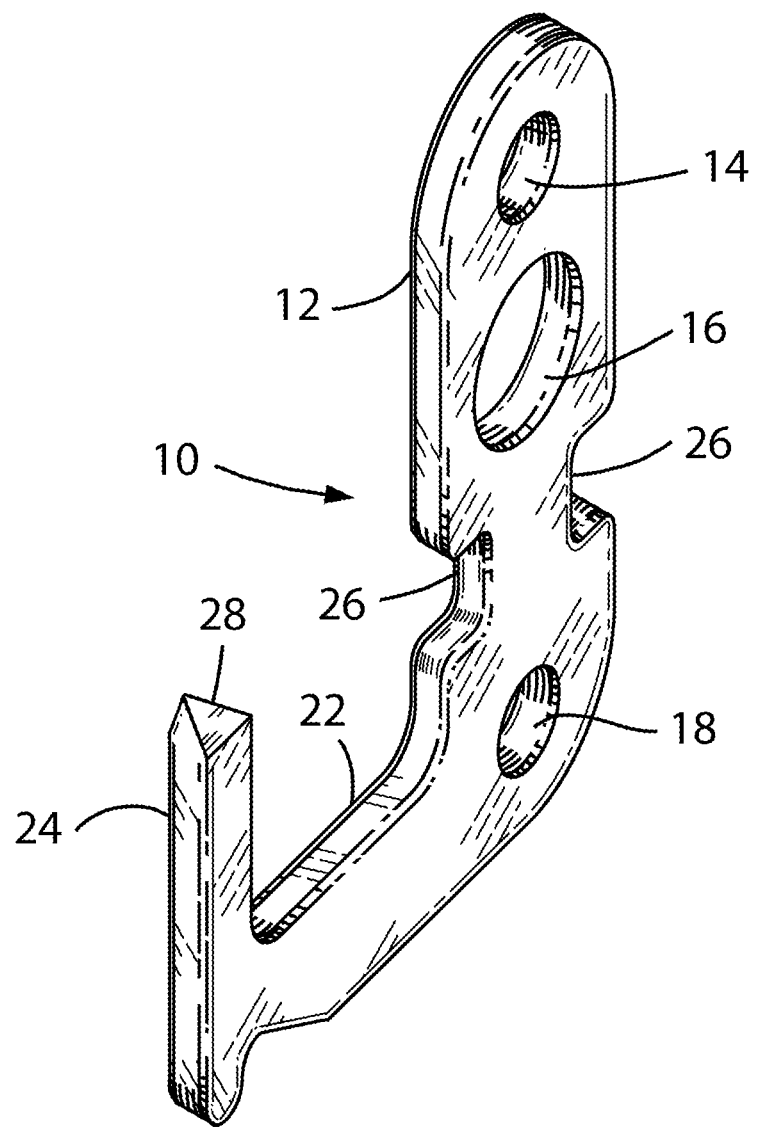
FIG. 6 is a perspective view taken from above and to one side

In general, and referring to FIG. 1, there is a rope portion 12 having three openings therein. One opening 14 is at a top of device 12, a second opening 16 is generally in a middle of device 12 and a third opening 18 is at a bottom of device 12. A brake portion 20 includes a brake bar 22 and a brake retainer 24 extending perpendicularly as shown. Relative proportions of these parts are such that rope portion 12 is about 3 times longer than it is wide, brake bar 22 is about half as wide as rope portion 12 and brake retainer 24 is about half as wide as brake bar 22. Middle opening 16 is about 1.9 times larger in diameter than openings 14, 18. A slot formed between rope portion 12 and brake retainer 24 is about 10% to 15% or so wider than a width of rope portion 12. A region 26 on rope portion 12 is shown as being of a smaller in width dimension than portion 12, typically for receiving a loop of rope. Brake retainer 24 extends upward a distance about 2.2 times longer than the width of brake retainer 22. Opening 16 between openings 14 and 18, while generally in the middle of rope portion 12, is shown as being higher on rope portion 12 in order to accommodate region 26. As shown, opening 18 is located generally at an intersection between brake bar 22 and rope portion 12. A notch 30 having an angled edge is in a lower, outside edge of brake bar 22, the angle of this edge selected so that a line from a center of opening 14 to edge 30 is generally perpendicular to the edge 30. This is advantageous to prevent slippage of a tensioned rope when a loop of tensioned rope is pushed through opening 14, looped around brake retainer 24 and positioned in notch 30 in order to hold the loop in place. In one exemplary embodiment of a device 10, rope portion 12 may be about 1.75 inches or so in width and about 5.25 inches or so in height from a top edge to a bottom edge below opening 18. As such, device 10 may be about 4.2 inches from an outer edge of rope portion 12 to an outer edge of brake retainer 24. Brake retainer 24 extends upward from brake bar 22 a little over 2 inches or so. The slot between an inner edge of rope portion 12 and an inner edge of brake retainer 24 may then be a little over 1.9 inches or so, and within which the thick dimension of dimension lumber, typically 1.75 inches, will fit. Openings 14, 18 may be from about 0.5 inches to about 0.625 inches or so in diameter in order to accept a rope, carabiner, D-ring or other such load bearing clip or device. As such, opening 16 is about 0.9 to about 1.2 inches in diameter. An end 28 of brake retainer 24 is generally pointed or sharpened to facilitate its use as a gouge or auger to gouge out and dig holes through relatively soft material, such as plastic, sheetrock™ or other wallboard, lath or other light material used for walls, or otherwise be similarly used. Edges of openings 14, 16 and 18 are chamfered, provided with a radius or otherwise smoothed so as not to chafe or cut a rope or cord, and all exterior edges are beveled, provided with a radius or likewise chamfered or smoothed to likewise not cut or chafe a rope or cord. As such, the entire device 10, with the exception of point 28, is completely smooth and free of relatively sharp edges, and in some embodiments has smoothed and polished edges, so as to not only not cut or chafe a rope but also to enable a rope to smoothly slide across all edges thereof. As noted, a notch 30 is provided to assist in retaining a loop of rope on brake bar 22, as will be further explained.

One rope that may be used in conjunction with the exemplary embodiment of the instant invention is a specialty rope 5 millimeters thick, and known as Techcord™, and which is available from New England Ropes. Techcord™ has a breaking strength of 5,000 pounds, and is easily capable of holding the weight of two people. Other ropes may also be used as long as the breaking strength is sufficient to hold the anticipated load and the rope is sufficiently pliable to be inserted, or looped and the loop inserted, through the various openings of device 10. One advantage of using Techcord™ is that a person, such as a fireman or other rescue person, can carry two or three devices 10 that are approximately 5 inches square or rectangular, and 100 feet of Techcord in a thigh pocket of a fireman's turnout pants, or in a small bag about 10 inches square that also may be worn or carried on a belt or harness. It is noted that rope shown in the drawings is shown exaggerated in thickness for clarity.

One of openings 14, 18 are typically used to connect to a weight-carrying carabiner, D-ring or other connection of a harness of a user, or in an emergency, even a loop of rope worn by a user or person being rescued or the like. Opening 16, being larger, may receive a loop of a rope or an anchoring rod, bar or the like, while opening 18, being approximately the size of opening 14, may also be used to connect to a rope, D-ring, carabiner or other connection device.

FIGS. 2-5 are top, bottom and side views of device 10. As shown, device 10 is relatively thick, being from about 0.25 to 0.5 inches or so, which thickness may depend on the material from which the device is made and the device's anticipated loading. As noted, where larger loads are anticipated, such as a person, the device would be of a strong, durable metal.

Brake bar 22 and brake retainer 24 may be used as a hook in order to anchor the device to a door, window sill, wall stud or any other suitable anchor to escape a building that may be on fire, in danger of collapsing, exploding or the like. In this instance, and as noted, width and thickness of the brake bar and retainer would depend on strength of the specific material from which device 10 is made so that the brake bar and retainer are sufficiently robust to bear at least the weight of a person. Here, the gap between the inner edge 29 of brake retainer 24 and inner edge 31 of rope portion 12 may be around 2 inches or so in order to accommodate the thickness of dimension lumber typically used to construct walls, the thickness of which being on the order of 1.75 inches. In this instance, device 10 may be conveniently used as an anchor simply by gouging and pounding out softer wall material mounted to a wall stud or the like and hooking brake bar 22 and brake retainer 24 to the wall stud. Any other anchor point is also envisioned, such as hooking brake bar 22 and brake retainer 24 over a door hinge, piping, or any other heavy or stationary object. Point 28 may be driven through relatively thin sheet metal by hand or by using a fireman's hammer to serve as an anchor, such sheet metal found on refrigerators, clothes washing machines, driers, water heaters and so forth. When used as an anchor in this manner, a rope, carabiner, D-ring or other clip in turn attached to a rope may be secured to device 10 at one of openings 14 or 16 of device 10. Of course, a rope loop pushed through one of openings 14, 16 may also be used, with the free end of the rope tied to the tensioned portion, or the rope simply tied to an opening of device 10. A person may then use the rope to exit a burning building or other situation. As will be described, device 10 may be used as a rappelling device, a belaying device, an anchor, hammer, glass breaker or any other use imaginable.

Figure 7:
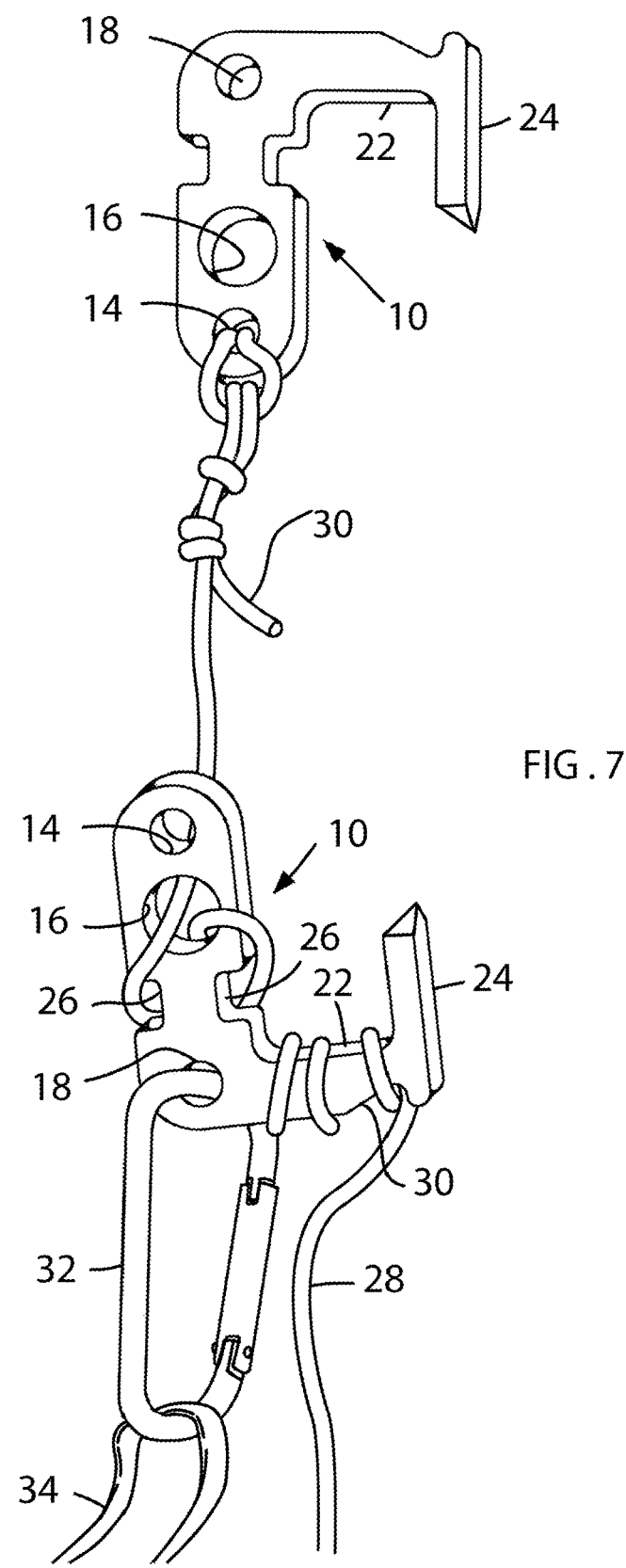
FIG. 7 is a view showing how two devices of the invention may be rigged for rappelling.

FIG. 7 shows how device 10 may be used as an escape device for a person to rappel, such as when exiting through an elevated window or balcony door from a multi-story building. Here, there are two devices 10, the upper device 10 used as an anchor and being tied or otherwise secured to one end 30 of a rope, D-ring, carabiner or other clip-type device via opening 14. At lower device 10, prior to connecting to D-ring 32, a loop of rope is formed and the loop simply pushed through opening 16 and the loop passed around or over brake 22 and brake retainer 24. With the loop loosely positioned in recessed regions 26, the free portion 28 of the rope is wrapped as shown around brake bar 22. The number of wraps of rope around brake bar 22 in order for a person to safely lower themself will depend on weight of the person, with more wraps for a heavier person and fewer wraps for a lighter person. In general, it has been found that 1-3 wraps of rope around brake bar 22 are sufficient for most applications. After passing the loop or loops over brake bar 22, the lower device 10 is connected to the person leaving the building, as by a loop of rope, a D-ring (hook to harness) of a harness 34, such as a fireman's harness, climbers harness, an emergency improvised harness or the like, the D-ring secured through opening 18 of the lower device 10.

With this configuration, and while descending the rope, a person can hold the lower device 10 or D-ring 32 with one hand and control their descent by varying tension of free end 28 of the rope about the brake bar with the other hand, lowering himself on the rope. To stop his descent, the person simply tightens the free end of the rope on the brake bar, with friction of the loops of rope around the brake bar holding him in place. During descent, brake retainer 24 prevents the loops of rope from slipping form brake bar 24. For locking a person in position during descent, as where a fireman lowers himself from a roof to enter a building through a window, a second loop may be made in free end 28 of the rope, and the loop passed through the upper opening 14 of device 10 and thereafter over brake retainer 24, with the loop placed in notch 30 of brake bar 22, locking the fireman in place on the rope and freeing his hands for other tasks. To unlock the rope, the loop is simply removed from notch 30 and brake bar 22, passed over brake retainer 24 and the loop removed from opening 14. In some instances, because weight of the person pulls device 10 into an orientation as shown in FIG. 7, the person may not need to hold the device, freeing one hand to carry a load while using the other hand to vary tension of the rope wrapped about the brake bar. As noted, brake bar retainer 24 serves to prevent loops of the rope wrapped around brake bar 22 from slipping from the end of brake bar 22.

One advantage of device 10, in addition to being easy to carry along with 100 feet of the described 5 millimeter rope, is that there is no necessity for the free end of the rope to be threaded through the openings of the device in order to configure it, as is required in other prior art devices. Rather, all that is required to configure the device is for the user to form a loop of rope and push the loop of rope through an opening in device 10, pass the loop over the brake bar and brake retainer and secure the loop around device 10 in regions 26. Where a loop is at the free end of a rope, such as end 30, the free end may simply be tied to the rope after being passed through an opening in the device. In instances where the device is to be secured to a middle of a rope, a loop may be pushed through an opening, and the device and loop tied to the rope with one or more overhand knots. This eliminates any need to thread the rope through any openings to secure the device to a rope. While opening 16 is larger and more easily receives a loop of rope, a loop of the aforementioned 5 mm rope may also be pushed through any of the openings in device 10 and looped around the device in order to configure it for different functions.

In instances where device 10 is used by firemen, a first device 10 may be preattached to one end of a rope as shown in FIG. 7 to serve as an anchor, with the rope and attached device 10 carried in a pocket, such as a thigh pocket of turnout pants or a small bag, along with 1 or more free devices 10. If an emergency arises requiring fast egress from a building, the device 10 already secured to an end of the rope may be quickly deployed and secured at a suitable anchor point, as by punching or gouging through soft wall material and using the device 10 as a hook on a wall stud or the like, or by wrapping the rope around a heavy object and securing the rope to the device 10. A second device 10 may be configured on the rope as a rappel as described above. Once an anchor point is found and the rope anchored, the device 10 that serves as a rappel can be configured for use as a rappel and clipped to a harness in less than 5 seconds in order for a fireman to easily and safely leave a building from an elevated window or balcony door of a multi-story building.

Figure 8:
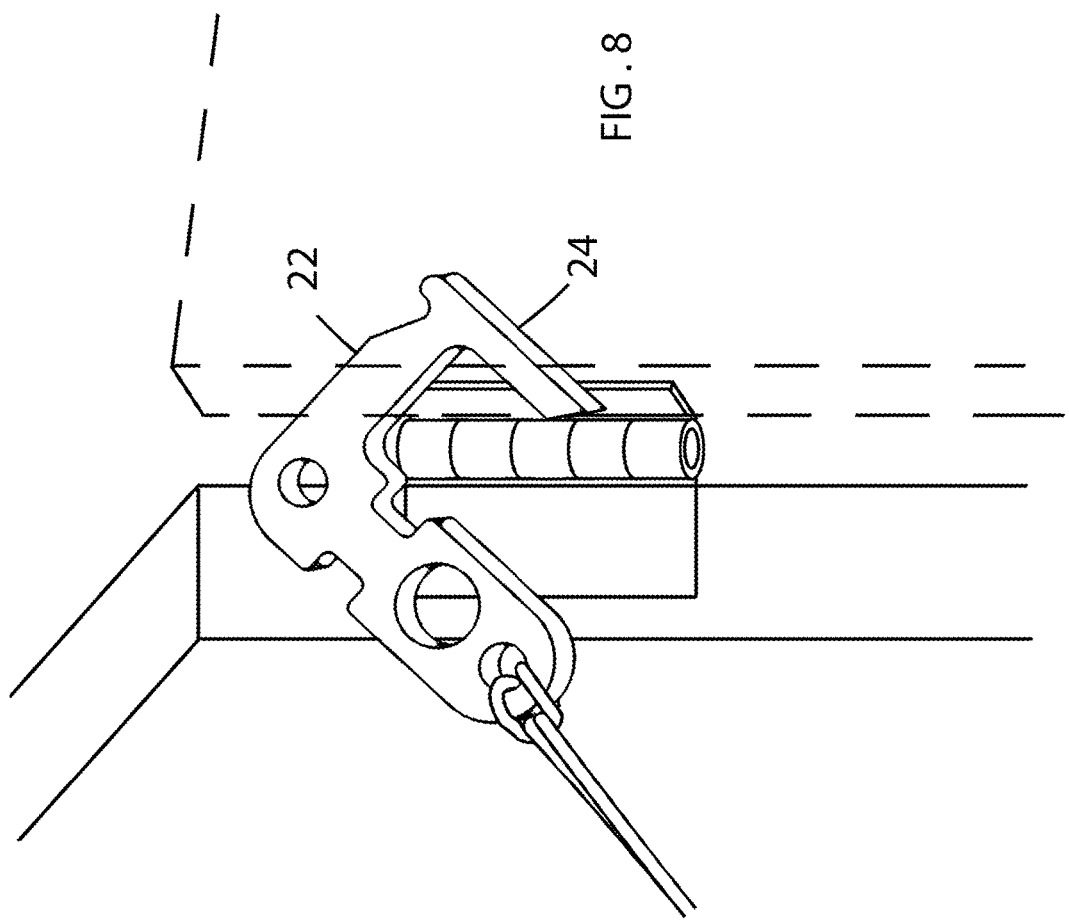
FIG. 8 is a view of a device of the invention rigged as an anchor hook, and placed on a hinge of a door.

FIG. 8 illustrates how brake bar 22 and brake retainer 24 serve as a hook, and can be used to secure a device 10 to an anchor, such as a hinge of a door. Here, the brake bar 22 and brake retainer 24 are simply placed over the door hinge, anchoring device 10 in place.

As noted, opening 16 may be sized to accept a rod or bar, which may be a broom handle or any other convenient rod or bar-like object that may be inserted through opening 16 and wedged in place against a corner of a window frame, across a door frame or any other secure anchor. As such, opening 16 may be on the order of 1.0 inches to about 1.25 inches or so, which should be sufficiently large to receive any broom handle or the like that would be found in a building.

Figure 9:
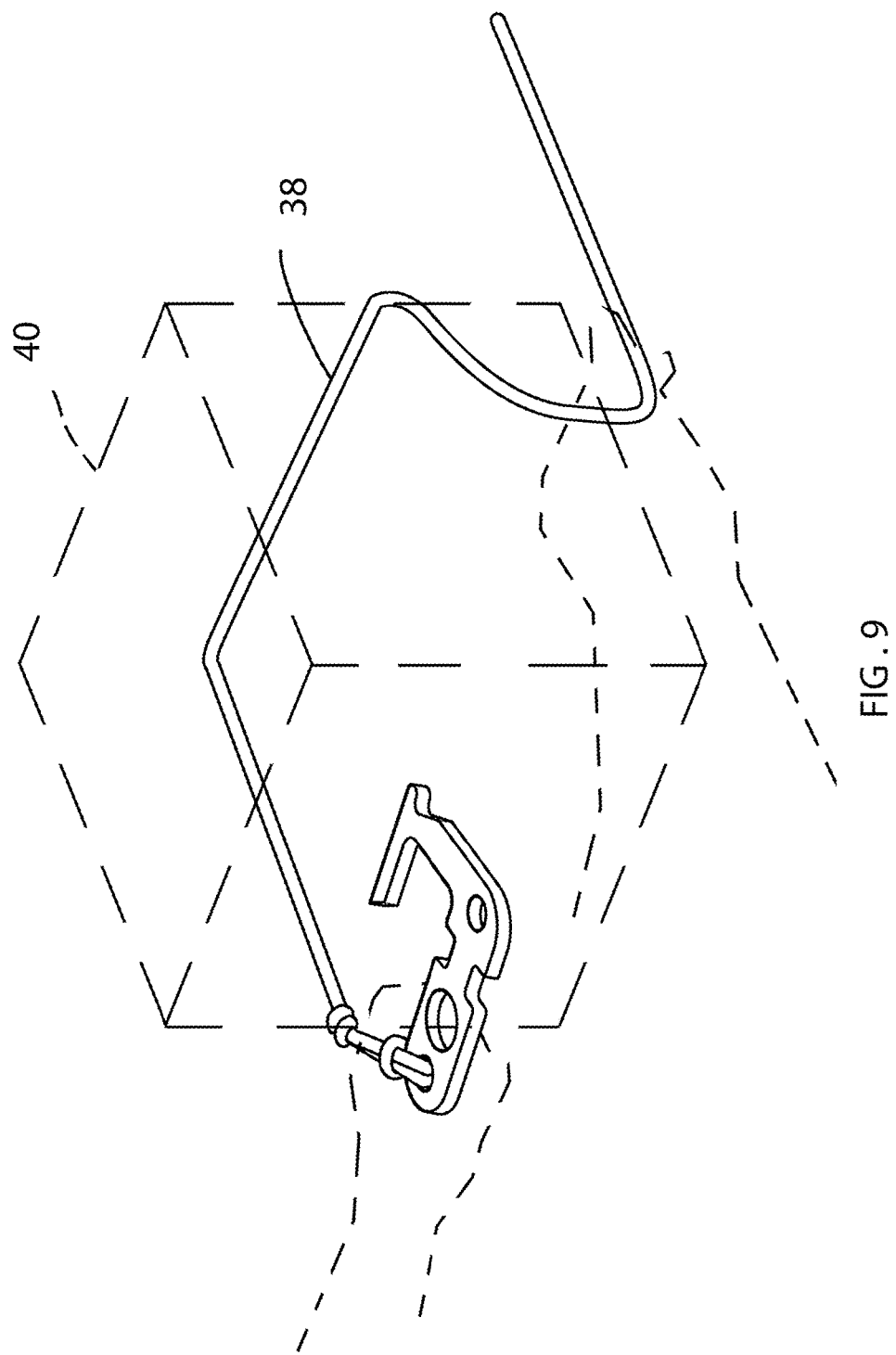
FIGS. 9-12 show a sequence of how a device of the invention may be quickly rigged as an anchor around an object.
Figure 10:
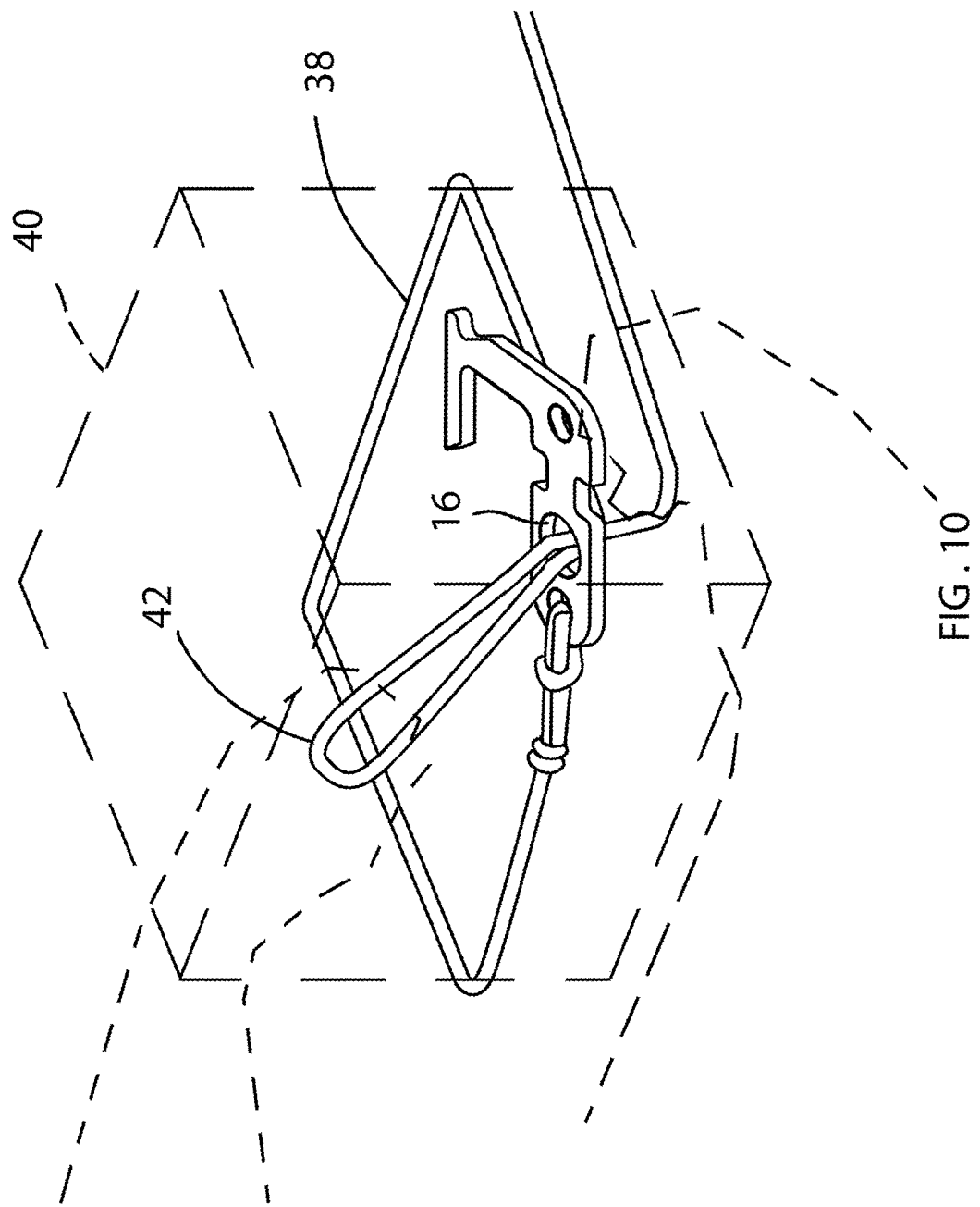
Figure 11:
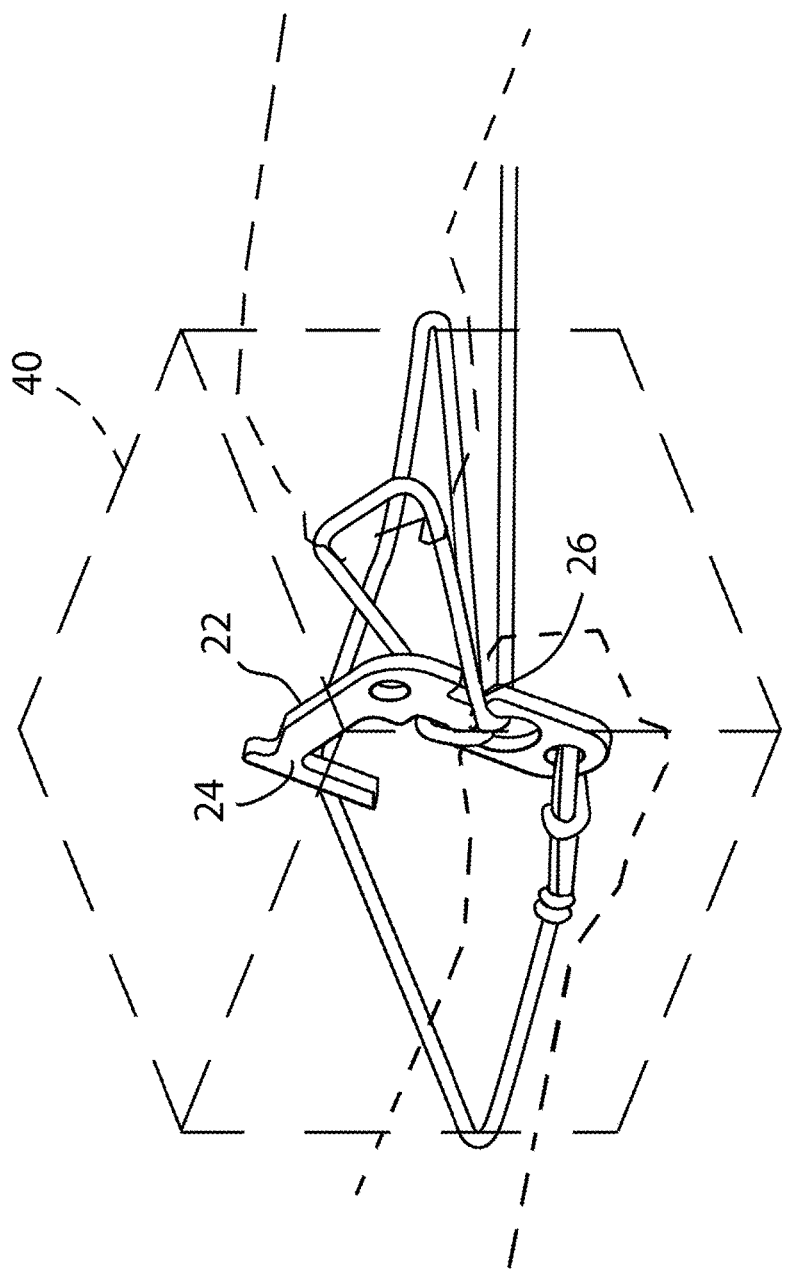
Figure 12:
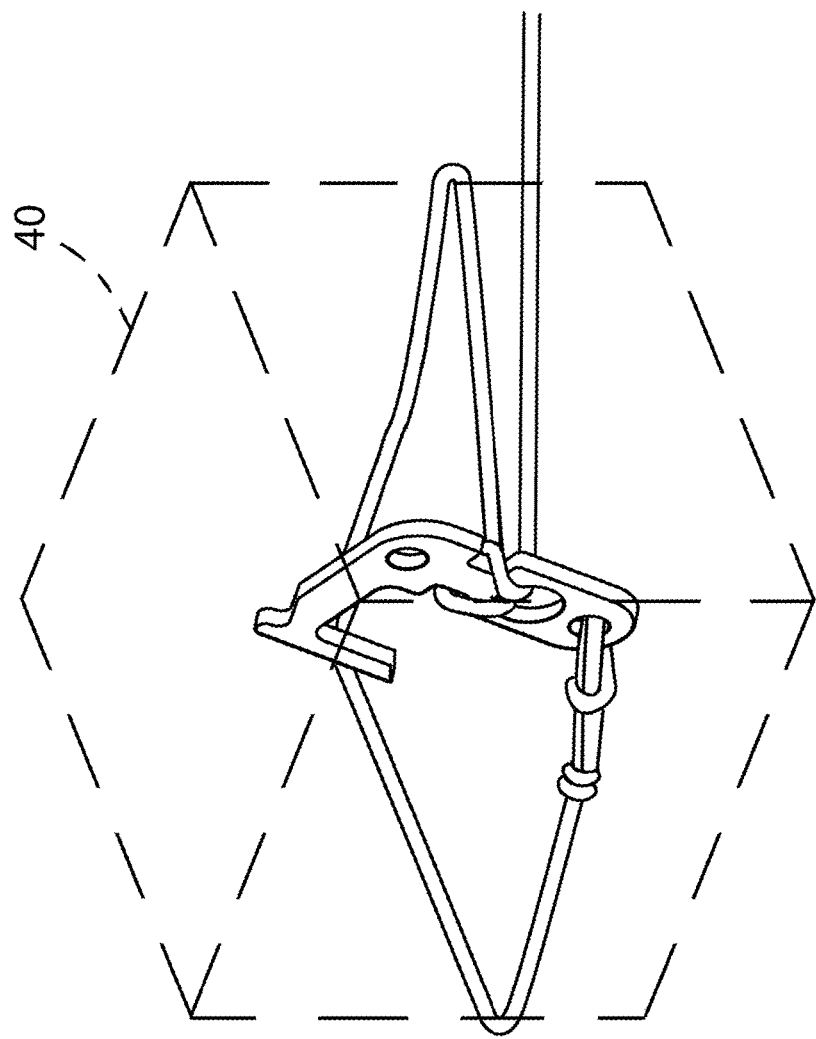

FIGS. 9, 10, 11 and 12 show how a rope tied off via opening 14 may be secured around a chair, desk, refrigerator or any other large, heavy object too big to be pulled through a window or door. Here, FIG. 9 shows rope 38 being placed around an object 40 (dashed lines) and gathered, and FIG. 10 shows a loop 42 being formed in the rope and inserted through larger opening 16 in device 10. In FIG. 11, loop 42 is then passed over brake bar 22 and retainer 24 so that the loop is fitted around and secured in the narrowed regions 26 of device 10. FIG. 12 shows the completed anchor looped around object 40.

Figure 13:
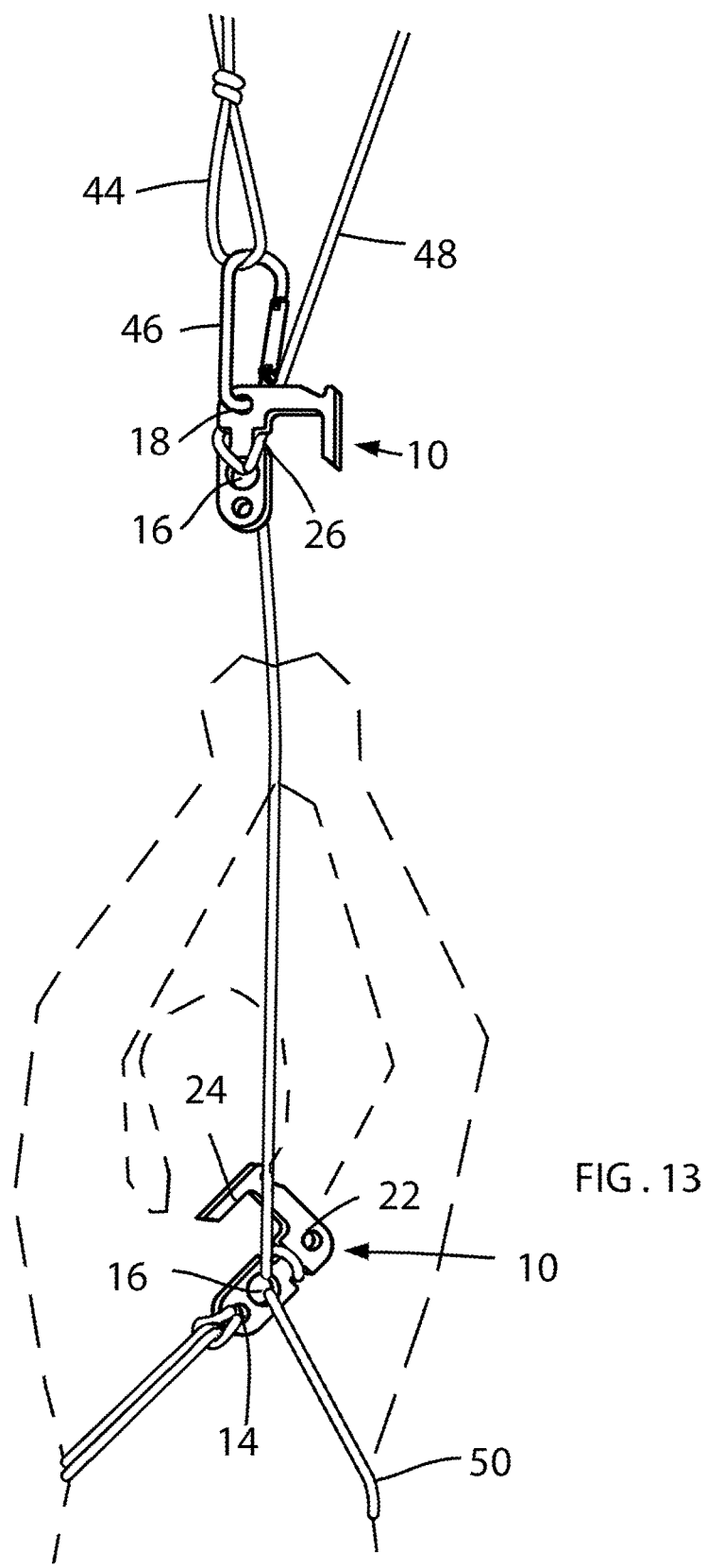
FIG. 13 shows how two devices of the invention may be rigged as an anchor and a belay device.

FIG. 13 shows how a pair of devices 10 and a rope may serve as a belay device to lower people or other loads from an elevated position. Upper device 10 is anchored in place, as by an anchor rope 44 passed through opening 18, or a D-ring 46 connected via opening 18. Prior to connecting the rope or D-ring 46, a loop is formed in load line 48 and the loop pushed through opening 16 of upper device 10 and over the brake retainer and brake bar. The loop is then positioned in recessed regions 26. At the other end of the rope that is to be secured to the load, the end of the rope is attached to opening 14, as by a D-ring, carabiner, clip or the like, or simply by forming a loop and pushing the loop through opening 14 and pulling the rope through the loop as shown. One or more overhand knots may then be tied to secure device 10 to the end of the rope. A second loop is formed and pushed through opening 16 of the second device 10 and looped around brake bar 22 and retainer 24. A third loop 50 is formed by pulling the rope through opening 16 and securing loop 50 around the person or load. With this configuration, the line will not slip and tighten on the person. Rope 48 at upper device 10 is then used as a belay to lower the person or load. If necessary, one or more loops may be placed around brake bar 22 of upper device 10 in order to create more friction in order to control a heavier load.

While specific uses have been disclosed, it should be apparent that there are many other uses for a device of the instant invention. Any climber, such as tree trimmers and loggers, mountain climbers and others will find uses for such a device. Campers would find Its size makes it good for light hammering, and even as a personal defense weapon for hitting and gouging. The pointed tip and associated edge on extension 24 can be used to open bottles, cans of food and can serve as an auger for creating or enlarging openings in wood, plastic and other soft materials. Fabricated in a small size, devices 10 can serve as tent and canopy toggles and for securing gear and tightening and loosening cords in all applications.

Having thus described my invention and the manner of its use, it should be apparent to those skilled in the relevant arts that incidental changes may be made that fairly fall within the scope of the following appended claims,

Wherein I claim:

1. A multifunction device for use with at least a rope comprising:

an elongated rope portion having at least three openings for at least receiving a rope or clip connected to said rope, wherein a first opening is at an upper end of said elongated rope portion, a second opening is at an opposite end of said elongated rope portion and a third opening is between said first and second openings, and further wherein said third opening is 1.9 times larger than said first and second openings, a brake bar on said elongated rope portion, said brake bar being at one end of said elongated rope portion and oriented perpendicular to said elongated rope portion, said brake bar having one edge adjacent said elongated rope portion and an opposite edge coincident with one end of said elongated rope portion, a brake retainer on said brake bar, said brake retainer being perpendicular to said brake bar and oriented parallel to said elongated rope portion, forming a slot between an inner edge of said elongated rope portion and an inner edge of said brake retainer, said elongated rope portion, said brake bar and said brake retainer being generally in the same plane.

2. A multifunction device as set forth in claim 1 further comprising a narrowed region on said elongated rope portion, said narrowed region being between said third opening and said second opening.

3. A multifunction device as set forth in claim 1 wherein said elongated rope portion is three times longer than said elongated rope portion is wide.

4. A multifunction device as set forth in claim 3 wherein said brake bar is half as wide as said elongated rope portion, and said brake retainer is half as wide as said brake bar.

5. A multifunction device as set forth in claim 4 wherein spacing of said slot between an inner edge of said brake retainer and an inner edge of said elongated rope portion is 10% greater than a width of said elongated rope portion.

6. A multifunction device as set forth in claim 5 wherein said device is sized such that said slot is 2 inches between said inner edge of said brake retainer and an inner edge of said elongated rope portion in order to receive a thickness dimension of dimension lumber.

7. A multifunction device as set forth in claim 1 wherein said elongated rope portion is from 1.5 inches to 5 inches in length.

8. A multifunction device as set forth in claim 1 further comprising a notch in an outside edge of said brake bar, said notch having an edge perpendicular to a line intersecting with a center of said first opening.

* * * * *